United States Patent
Backensto et al.

(10) Patent No.: US 8,078,910 B1
(45) Date of Patent: Dec. 13, 2011

(54) METHOD AND SYSTEM FOR PROVIDING COORDINATED CHECKPOINTING TO A GROUP OF INDEPENDENT COMPUTER APPLICATIONS

(75) Inventors: Keith Richard Backensto, San Jose, CA (US); Allan Havemose, Arroyo Grande, CA (US)

(73) Assignee: Open Invention Network, LLC, Durham, NC (US)

( * ) Notice: Subject to any disclaimer, the term of this patent is extended or adjusted under 35 U.S.C. 154(b) by 273 days.

(21) Appl. No.: 12/334,634

(22) Filed: Dec. 15, 2008

(51) Int. Cl.
*G06F 11/00* (2006.01)

(52) U.S. Cl. .......................... 714/15; 714/35

(58) Field of Classification Search ............... 714/15
See application file for complete search history.

(56) References Cited

U.S. PATENT DOCUMENTS

| | | | |
|---|---|---|---|
| 4,823,261 A * | 4/1989 | Bank et al. ............... 711/152 |
| 4,912,707 A * | 3/1990 | Kogge et al. .................. 714/17 |
| 5,774,660 A | 6/1998 | Brendel et al. |
| 5,951,650 A | 9/1999 | Bell et al. |
| 5,996,016 A | 11/1999 | Thalheimer et al. |
| 6,021,408 A | 2/2000 | Ledain et al. |
| 6,026,499 A | 2/2000 | Shirakihara et al. |
| 6,154,877 A | 11/2000 | Ramkumar et al. |
| 6,161,219 A | 12/2000 | Ramkumar et al. |
| 6,484,276 B1 | 11/2002 | Singh et al. |
| 6,496,979 B1 | 12/2002 | Chen et al. |
| 6,691,245 B1 * | 2/2004 | DeKoning ................... 714/6 |
| 6,718,538 B1 * | 4/2004 | Mathiske ................. 717/129 |
| 6,823,474 B2 * | 11/2004 | Kampe et al. ............... 714/13 |
| 6,854,069 B2 * | 2/2005 | Kampe et al. .............. 714/4 |
| 7,020,599 B1 * | 3/2006 | Cao et al. ................... 703/22 |
| 7,096,388 B2 | 8/2006 | Singh et al. |
| 7,243,262 B2 * | 7/2007 | Mukherjee et al. .......... 714/15 |
| 7,293,200 B2 * | 11/2007 | Neary et al. ................. 714/35 |
| 2002/0007468 A1 * | 1/2002 | Kampe et al. ............... 714/4 |
| 2002/0032883 A1 * | 3/2002 | Kampe et al. .............. 714/16 |
| 2002/0124089 A1 | 9/2002 | Aiken et al. |
| 2002/0169884 A1 | 11/2002 | Jean et al. |
| 2003/0028635 A1 | 2/2003 | DeMent et al. |
| 2003/0069993 A1 | 4/2003 | Na et al. |
| 2004/0210895 A1 | 10/2004 | Esfahany |
| 2004/0268175 A1 | 12/2004 | Koch et al. |
| 2005/0050304 A1 | 3/2005 | Mukherjee et al. |
| 2005/0251785 A1 | 11/2005 | Vertes et al. |
| 2006/0085679 A1 * | 4/2006 | Neary et al. ................ 714/13 |
| 2006/0090097 A1 * | 4/2006 | Ngan et al. ................... 714/6 |
| 2006/0143512 A1 | 6/2006 | Jia et al. |
| 2007/0277056 A1 * | 11/2007 | Varadarajan et al. ......... 714/15 |
| 2010/0107158 A1 * | 4/2010 | Chen et al. ................... 718/1 |

OTHER PUBLICATIONS

H. Nam, Probabilistic Checkpointing, Jul. 2002, IEICE Trans. INF & SYST., vol. E85-D, pp. 1-12.

J. Sancho. On the feasibility of incremental checkpointing for scientific computing, Apr. 2004, IEEE, Proceedings of the 18th International Parallel and Distrubuted Processing Symposium, pp. 1-9.

* cited by examiner

*Primary Examiner* — Scott Baderman
*Assistant Examiner* — Kamini Patel
(74) *Attorney, Agent, or Firm* — Williams Mullen (57) ABSTRACT

A method and system of checkpointing single process application groups and multi-process application groups. In an exemplary embodiment, the method may include creating at least one full checkpoint for each application in an application group, and creating at least one incremental application checkpoint for each application in the application group. Further, each of the at least one incremental application checkpoint may be automatically merged against a corresponding full application checkpoint. Further, checkpointing may be synchronized across all applications in the application group. In the exemplary embodiment, each application may use both fork( ) and exec( ) in any combination.

19 Claims, 10 Drawing Sheets

Fig. 1 – Core operation of fork()

Fig.2 – Core operation of exec()

Fig. 3 – Exec-Interceptor Mechanism to capture and preserve information across exec Fig. 4 – Incremental checkpointing of application groups using a mix of exec and fork/exec Fig.5 – Incremental Checkpointing of Application Groups Fig.6 – Launch and Registration of independently Launched Applications Fig.7 – Restoring an application group from a checkpoint Fig.8 – Incremental checkpointing of pages written from kernel Fig.9 – Deployment scenarios Fig.10 – System Description

METHOD AND SYSTEM FOR PROVIDING COORDINATED CHECKPOINTING TO A GROUP OF INDEPENDENT COMPUTER APPLICATIONS

CROSS-REFERENCE TO RELATED APPLICATIONS

This application is related to U.S. provisional application Ser. No. 60/797,219 filed on May 2, 2006, U.S. patent application Ser. No. 11/213,678 filed on Aug. 26, 2005, and U.S. patent application Ser. No. 11/741,535 filed on Apr. 27, 2007, each of which are incorporated herein by reference in their entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to enterprise computer systems, computer networks, embedded computer systems, wireless devices such as cell phones, computer systems, and more particularly with methods, systems and procedures (i.e., programming) for providing high-availability, virtualization and checkpointing services for a group of computer applications 2. Description of Related Art Enterprise and wireless systems operating today are subject to continuous program execution that is 24 hours a day and 7 days a week. There is no longer the concept of "overnight" or "planned downtime". All programs and data must be available at any point during the day and night. Any outages or deteriorated service can result in loss of revenue as customers simply take their business elsewhere, and the enterprise stops to function on a global scale. Traditionally, achieving extremely high degrees of availability has been accomplished with customized applications running on custom hardware, all of which is expensive and proprietary. Furthermore, application services being utilized today are no longer run as single applications or processes; instead, they are built from a collection of individual programs jointly providing the service. Traditionally, no mechanisms have existed for protecting such multi-application services This problem is compounded by the fact that the individual applications comprising the service are typically provided by different vendors and may get loaded at different times Two references provide a background for understanding aspects of the current invention. The first reference is U.S. patent application Ser. No. 11/213,678 filed on Aug. 26, 2005, incorporated above in its entirety, which describes how to provide transparent and automatic high availability for applications where all the application processes run on one node. The second reference is U.S. Pat. No. 7,293,200 filed on Aug. 26, 2005 which describes how to transparently provide checkpointing of multi-process applications, where all processes are running on the same node and are launched from one binary. The present invention is related to applications comprised of one or more independent applications, where the independent applications dynamically join and leave the application group over time.

BRIEF SUMMARY OF THE INVENTION

A method, system, apparatus and/or computer program are described for achieving checkpointing, restoration, virtualization and loss-less migration of application groups. The invention provides transparent migration and fail-over of application groups while ensuring that connected clients remain unaware of the migration. The client's connection and session are transparently transferred from the primary to the backup server without any client involvement The term "checkpointing" and "checkpointing service" is utilized herein interchangeably to designate a set of services which capture the entire state of an application group and stores all or some of the application group state locally or remotely. The checkpointing services run (execute) on all nodes where one or more the application group's applications run (execute) or can fail over to.

The term "node" is utilized herein to designate one or more processors running a single instance of an operating system. A virtual machine, such as VMWare or XEN VM instance, is also considered a "node". Using VM technology, it is possible to have multiple nodes on one physical server.

The term "application group" is utilized herein to describe a set of independent applications that jointly provide a service. The term "independent" is utilized herein to mean that the applications need no prior knowledge of each other. An application group is simply a logical grouping of one or more applications that together or independently provide some service. The independent applications do not need to be running at the same time. A member of the application group can also load, perform work and exit, essentially joining and leaving the group.

The terms "application" and "independent application" are utilized interchangeably to designate each of the applications in an application group. Each independent application can consist of one or more processes and be single threaded or multi-threaded. Operating systems generally launch an application by creating the application's initial process and letting that initial process run/execute. In the following teachings, we often identify the application at launch time with that initial process and then describe how to handle creation of new processes via fork and/or exec.

In the following, we use commonly known terms including but not limited to "process", "process ID (PID)", "thread", "thread ID (TID)", "disk", "CPU", "storage", "memory", "address space", "semaphore", "System V, SysV", and "signal". These terms are well known in the art and thus will not be described in detail herein.

The term "coordinator" is utilized for designating a special control process running as an element of the invention. The coordinator is generally responsible for sending out coordination events, managing application group registration and for coordinating activities across all applications in an application group. For the sake of simplicity, the coordinator is often depicted as running on the same node as the application-group, however this is not a requirement as the coordinator can run on any node.

The term "transport" is utilized to designate the connection, mechanism and/or protocols used for communicating across the distributed application. Examples of transport include TCP/IP, Message Passing Interface (MPI), Myrinet, FiberChannel, ATM, shared memory, DMA, RDMA, system busses, and custom backplanes. In the following, the term "transport driver" is utilized to designate the implementation of the transport. By way of example, the transport driver for TCP/IP would be the local TCP/IP stack running on the host.

The term "fork( )" is used to designate the operating system mechanism used to create a new running process. On Linux, Solaris, and other UNIX variants, a family of fork( ) calls are provided. On Windows, one of the equivalent calls is "CreateProcess( )". Throughout the rest of this document we use the term "fork" to designate the functionality across all operating systems, not just on Linux/Unix. In general fork( ) makes a copy of the process making the fork( ) call. This means that the newly created process has a copy of the entire address space, including all variables, I/O etc of the parent process.

The term "exec( )" is used to designate the operating system mechanism used to overlay a new image on top of an already existing process. On Linux, Solaris, and other UNIX, a family of exec( ) calls are provided. On Windows, the equivalent functionality is provided by e.g. "CreateProcess( )" via parameters. Throughout the rest of this document we use the term "exec" to designate the functionality across all operating systems, not just Linux/Unix. In general, exec( ) overwrites the entire address space of the process calling exec( ). A new process is not created and data, heap and stacks of the calling process are replaced by those of the new process. A few elements are preserved, including but not limited to process-ID, UID, open file descriptors and user-limits.

The term "shell script" and "shelf" is used to designate the operating system mechanism to run a series of commands and applications. On Linux, Solaris, and other Unix variants, a common shell is called 'bash'. On Windows, equivalent functionality is provided by "cmd.exe" and .bat files or Windows PowerShell. Examples of cross-platform scripting technologies include JavaScript, Perl, Python, and PHP. Throughout the rest of this document we use the term "shell" and "shell script" to designate the functionality across all operating systems and languages, not just Linux/Unix.

The term "interception" is used to designate the mechanism by which an application re-directs a system call or library call to a new implementation. On Linux and other UNIX variants interception is generally achieved by a combination of LD_PRELOAD, wrapper functions, identically named functions resolved earlier in the load process, and changes to the kernel sys_call_table. On Windows, interception can be achieved by modifying a process' Import Address Table and creating Trampoline functions, as documented by "Detours: Binary Interception of Win32 Functions" by Galen Hunt and Doug Brubacher, Microsoft Research July 1999". Throughout the rest of this document we use the term to designate the functionality across all operating systems.

In the following descriptions, the product name "Duration" is utilized in referring to a system as described in the first and second references cited previously. It should be appreciated, however, that the teachings herein are applicable to other similarly configured systems.

By way of example, consider an e-Commerce service consisting of a WebLogic AppServer and an Oracle Database. In this case WebLogic and Oracle would be the independent applications, and the application group would consist of WebLogic and Oracle database.

By way of example, consider a cell phone with an address book and built-in navigation system. In this case the address book and the navigation would be the independent applications, and the application group would consist of the address book and the navigation application.

By way of example, consider a shell-script running a series of applications and other scripts. In this case the script and all applications and scripts launched by the script comprise the application group, and all the individual applications and other scripts called within the script, are the independent applications.

The two references sited above cover the cases where the multi-process applications are created starting with one binary. As described in U.S. Pat. No. 7,293,200, this is generally accomplished by the application using a series of fork( ) calls to create new sub-processes. The present invention broadens the checkpointing services to cover all types of multi process applications, including those that exec( ).

In at least one embodiment, a method of checkpointing single process application groups and multi-process application groups is provided. The method may include creating at least one full checkpoint for each application process in an application group, and may include creating at least one incremental checkpoint for each application process in the application group. Further, the method may automatically merge each of the at least one available incremental application checkpoint against a corresponding full application checkpoint, and synchronize checkpointing across all applications in the application group. Each application may use both fork( ) and exec( ) in any combination.

In at least one embodiment, a special mechanism is provided to handle exec-only calls. With exec essentially overwriting the entire address space of the calling process, all registration and checkpointing information is lost. Special care needs to be taken to preserve this information across the exec call. One example embodiment of the present invention provides a mechanism to preserve such information using a combination of shared memory and environment variables.

In at least one embodisment, checkpointing services are configured for automatically performing a number of application services, including: injecting registration code into all applications in the application group during launch, registering the group's application as they launch, detecting execution failures, and executing from backup nodes in response to application group failure, application failure or node failure. The services can be integrated transparently into the system in that they are implemented on the system without the need of modifying or recompiling the application program, without the need of a custom loader, or without the need for a custom operating system kernel. In another embodiment, a custom loader is used.

In at least one embodiment, the checkpointing services are configured to support fork( ) and exec( ) in any combination. Exec( ) without an prior fork( ) overwrites the entire address space of the application, including all registration with the coordinator, fault detectors etc. The present invention provides techniques to handle the fact that all memory and registration information is being overwritten during exec( ).

In at least one embodiment, the checkpointing services supports shell scripts, where the core shell script application launches (using fork( )/exec( )) and overlays (using exec( )), new independent applications in any order.

The present invention comprises a set of checkpointing services for application groups. The checkpointing services run on every node where the group application can run. One embodiment of the invention generally functions as an extension of the operating system and runs on all nodes. A coordination mechanism is utilized to ensure that the execution of the independent applications are coordinated at certain points.

By way of example, and not of limitation, the present invention implements checkpointing services for stateless applications (e.g., sendmail), stateful applications (e.g., Voice over IP (VOIP)), multi-tier enterprise applications (e.g., Apache, WebLogic and Oracle Database combined), wireless devices, such as cell phones, pages and PDAs, and large distributed applications, for example those found in High Performance Computing (HPC), such as seismic exploration and financial modeling.

According to one aspect of the invention, the application group runs on a node, with one or more of the independent applications running at any point in time. Each independent application is running independently, but is protected and checkpointed together with all other independent applications in the application group.

According to one aspect of the invention the application group has one or more backup nodes ready to execute the independent application in the place of the original in the event of a fault. The protection of the application group is thus coordinated and guaranteed to be consistent across fault recovery.

An application group can be configured according to the invention with any number of independent applications. Each independent application runs on the primary node while the backup node for the applications stands ready to take over in the event of a fault and subsequent recovery. The primary and backup can be different nodes or the primary and backup can be the same node, in which case the fault recovery is local.

The invention provides layered checkpointing services for application groups, with checkpointing services provided both at the application group level and at the individual independent application level. High availability, including fault detection and recovery, for the individual independent application is provided by Duration's existing stateful High Availability Services. The invention layers a distributed fault detection and recovery mechanism on top of the local fault detection and ensures that fault detection and recovery is consistent across the entire grid.

According to one aspect of the invention, a coordinator provides general coordination and synchronization for the individual independent applications of the group applications. By way of example, and not limitation, the coordinator is shown running on the same node as the independent applications to simplify the following teachings. It should be appreciated, however, that this is not a requirement as the coordinator can run on any node in the system.

By way of example, and not of limitation, the invention implements stateless or stateful recovery of application groups by recovering each independent application and ensuring all independent applications are recovered in a consistent state. The recovery is automatic without any application group or independent application involvement.

According to an aspect of the invention, there is a clean separation of the application logic from the checkpointing services code. This allows application programmers to focus on writing their application code, rather than on writing checkpointing code. An administrator can make applications highly available by simply configuring the desired settings, such as by using a graphical configuration tool implemented according to the invention. The result is that high availability applications are developed easily and deployed quickly without the necessity of custom coding.

According to another aspect of the invention, protection is provided against node faults, network faults and process faults. The present invention provides user-controlled system management, automatic availability management, and publish/subscribe event management, including notification of faults and alarms.

In various embodiments of the invention, features are provided that are useful for application groups that must be highly available, including but not limited to the following:

(a) Stateful high availability and checkpointing for application groups, scripts, including high performance computing, financial modeling, enterprise applications, web servers, application servers, databases, Voice Over IP (VOIP), Session Initiation Protocol (SIP), streaming media, Service Oriented Architectures (SOA), wireless devices, such as cell phones, and PDA.

(b) Coordinated Restart and stateful restore for applications groups.

(c) Coordinated and transparent checkpointing of application groups, (e) Coordinated full and incremental checkpointing for applications groups.

(f) Checkpoints stored on local disks, shared disks, or memories.

(g) Automatic and transparent fault detection for application groups.

(h) Node fault detection.

(i) Process fault detection.

(j) Application group deadlock and hang protection through external health checks.

(k) Coordinated automatic and transparent recovery of applications groups.

(l) Auto-startup of applications groups.

(m) Script support of starting, stopping, or restarting.

(n) Dynamic policy updates.

(o) User-controllable migration of distributed applications.

The invention can be practiced according to various aspects and embodiments, including, but not limited to, those described in the following aspects and embodiments which are described using phraseology which is generally similar to the claim language.

According to an aspect of the invention a method for achieving transparent integration of a application group program with a high-availability protection program comprises: (a) injecting registration code, transparently and automatically, into all independent applications when they launch, without the need of modifying or recompiling the application program and without the need of a custom loader; (b) registering the independent applications automatically with the high-availability protection program; (c) detecting a failure in the execution of the application group or any independent application within the group; and (d) executing the application group with application group being executed from their respective backup servers automatically in response to the failure. The high-availability protection program is preferably configured as an extension of the operating system wherein recovery of application groups can be performed without modifying programming within said application programs. The high-availability protection can be configured for protecting against node faults, network faults, and process faults.

According to another aspect of the invention, a method, system, improvement or computer program for performing loss-less migration of an application group, including loss-less migration of all independent applications from their respective primary nodes to their backup nodes and while being transparent to a client connected to the primary node over a TCP/IP, MPI, system bus or other transport. The transport, i.e. TCP/IP, MPI, or system bus will optionally be flushed and/or halted during checkpointing.

According to another aspect of the invention, a method, system, improvement or computer program performs loss-less migration of an application group, comprising: (a) migrating the independent applications within an application, without loss, from their respective primary nodes to at least one backup node; (b) maintaining transparency to a client connected to the primary node over a transport connection; (c) optionally flushing and halting the transport connection during the taking of checkpoints; and (d) restoring the application group, including all independent applications, from the checkpoints in response to initiating recovery of the application. The execution transparency to the client is maintained by a high-availability protection program configured to automatically coordinate transparent recovery of distributed applications. Transparency is maintained by a high-availability protection program to said one or more independent applications running on a primary node while at least one backup node stands ready in the event of a fault and subsequent recovery.

According to another aspect of the invention, a method, system, improvement or computer program performs fault protection for applications distributed across multiple computer nodes, comprising: (a) providing high-availability application services for transparently loading applications, registering applications for protection, detecting faults in applications, and initiating recovery of applications; (b) taking checkpoints of independent applications within applications groups; (c) restoring the independent applications from the checkpoints in response to initiating recovery of one or more the applications; (d) wherein said high-availability application services are provided to the independent applications running on a primary node, while at least one backup node stands ready in the event of a fault and subsequent recovery; and (e) coordinating execution of individual independent applications within a coordinator program which is executed on a node accessible to the multiple computer nodes.

According to another aspect of the invention, a method, system, improvement or computer program performs loss-less migration of an application group, comprising: (a) a high-availability services module configured for execution in conjunction with an operating system upon which at least one application can be executed on one or more computer nodes of a distributed system; and (b) programming within the high-availability services module executable on the computer nodes for loss-less migration of independent applications, (b)(i) checkpointing of all state in the transport connection, (b)(ii) coordinating checkpointing of the state of the transport connection across the application group (b)(iii) restoring all states in the transport connection to the state they were in at the last checkpoint, (b)(iv) coordinating recovery within a restore procedure that is coupled to the transport connection.

According to another aspect of the invention, there is described a method, system, improvement and/or computer program for maintaining all transport connection across a fault. Transport connections will be automatically restored using Duration's virtual IP addressing mechanisms.

Another aspect of the invention is a method, system, improvement and/or computer program that provides a mechanism to ensure that the independent applications are launched in the proper order and with the proper timing constraints during recovery. In one embodiment, a mechanism is also provided to ensure that application programs are recovered in the proper order.

Another aspect of the invention is a method, system, computer program, computer executable program, or improvement wherein user controllable launch of independent applications for the application group is provided.

Another aspect of the invention is a method, system, computer program, computer executable program, or improvement wherein user controllable stop of independent applications and application group is provided.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention will be described in relation to FIG. 1 through FIG. 10. It will be appreciated that the system and apparatus of the invention may vary as to configuration and as to details of the constituent components, and that the method may vary as to the specific steps and sequence, without departing from the basic concepts as disclosed herein.

1. Introduction.

The context in which this invention is described is an application group consisting of any number of independent applications. Each independent application runs on the primary node and can be supported by one or more designated backup nodes. Without affecting the general case of multiple backups, the following describes scenarios where each independent application has one primary node and one backup node. Multiple backups are handled in a similar manner as a single backup.

The mechanisms for transparently loading applications, transparently registering applications for protection, preloading libraries, transparently detecting faults, and transparently initiating recovery are described in the first reference above which was incorporated by reference. The mechanisms for taking checkpoints of multi-process, multi-threaded processes including processes using fork, and restoring from those checkpoints are described in the second reference above which was incorporated by reference. The mechanism for launching the coordinator, which in turn launches the application, is described in the first and second references, which were incorporated by reference. The mechanism used by the "Duration AM" to launch any process, including the coordinator, is described in the first and second reference and incorporated by reference. All applications in this invention may be launched by the Duration AM, through either a coordinator or directly.

2. Checkpointing Across Fork and Exec

Figure 1:
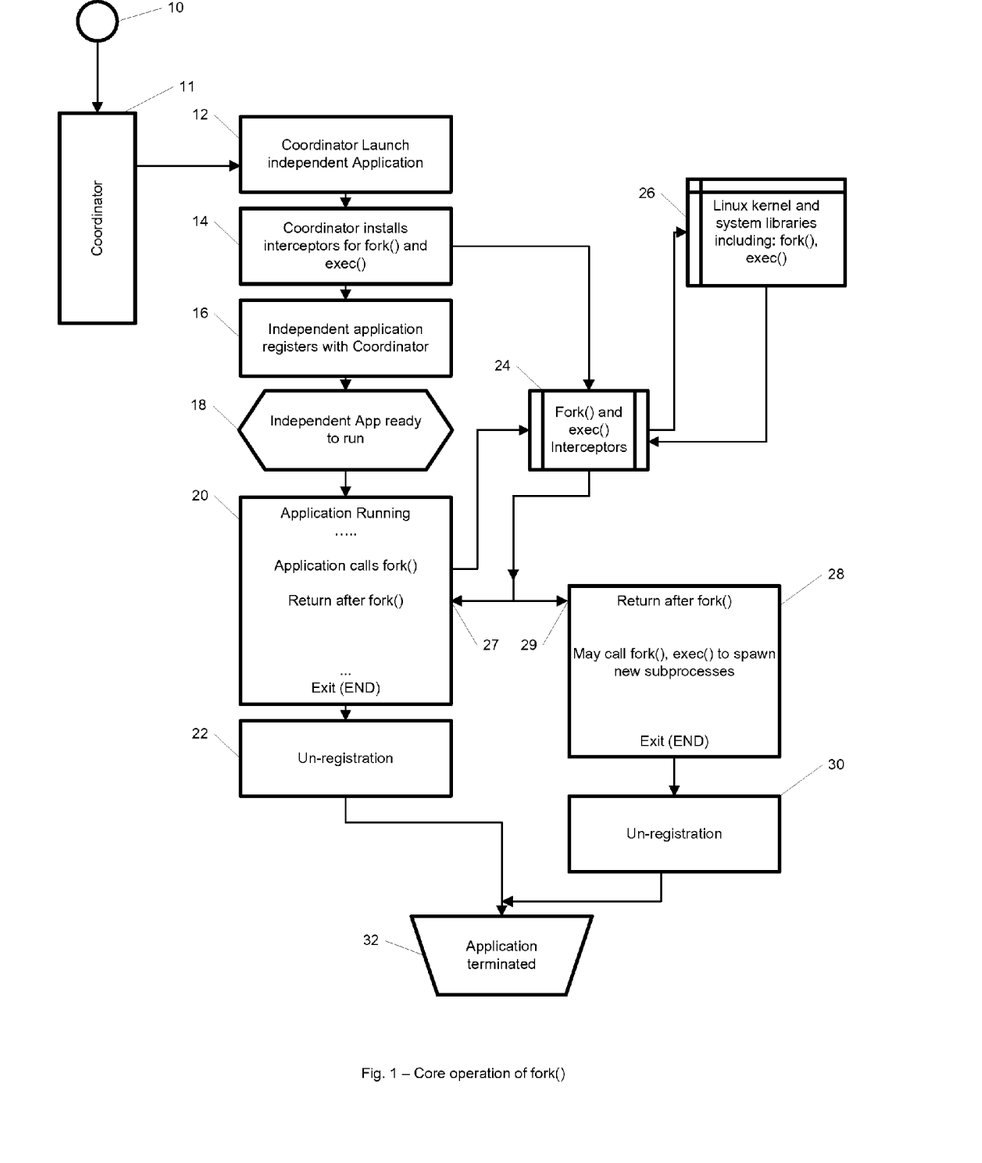
FIG. 1 is a block diagram of how a coordinator launches an independent application and the events and mechanism of installing the interceptor and handling fork( )

FIG. 1 illustrates, by way of example embodiment 10, an independent application 12 being launched by the coordinator 11. The coordinator 11 installs the interceptors 24 for fork and exec 14 and then takes the application through registration 16 with the coordinator. The interceptors 24 are not called at this point; they are loaded into memory and ready to take over when the application calls fork or exec. All preparation is now complete, and the application proceeds to run 18. If the application 20 issues a fork call, the control passes to the interceptor 24. The interceptor calls the operating system fork( ) 26, which in turn creates the new application process 28 and passes control back to the interceptors 24. The interceptors takes the new process 28 through the same configuration and registration as the parent process (14,15,18,20), and updates the process information for the parent process 20. The parent process 20 resumes execution with the instruction following fork( ) 27, and the child process 28 also resumes execution at the instructions following the return of fork( ) 29 Application processes 20 and 28 and now both executing. As each of the processes terminate 22, 30 they unregister, and the independent application terminates 32.

Figure 2:
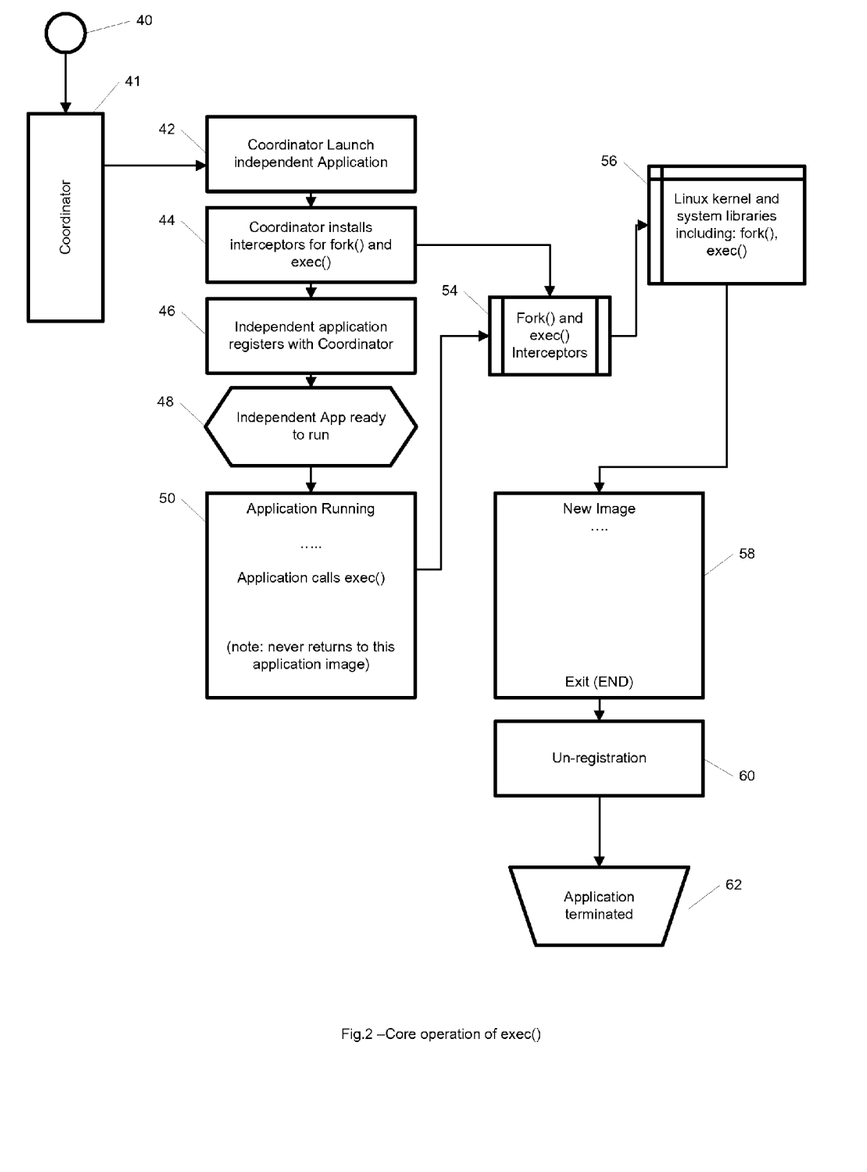
FIG. 2 is a block diagram of a how a coordinator launches an independent application and the events and mechanism of installing the interceptor and handling an exec-only( ) call.

FIG. 2 illustrates by way of example embodiment 40 an independent application 42 being launched by the Coordinator 41. The coordinator 41 installs the interceptors 54 for fork and exec and then takes the application through registration 46 with the coordinator. The interceptors 54 are not called at this point; they are loaded into memory and ready to take over when the application calls fork or exec. All preparation is now complete, and the application proceeds to run 48. If the application 50 issues an exec call, the control passes to the interceptor 54. The mechanism by which the interceptor keeps track of key application state across exec is described along with FIG. 3 below. The interceptor calls the operating system exec 56, which then in turn overlays the new image onto the existing application process 58. The checkpointer preload library takes the newly created image through full initialization, including registration with the coordinator and restoration of all internal state from shared memory, as described below the new process image 58 is now fully initialized and begins executing. The original process image 50 no longer exists as exec overwrote its address space. An environment variable CPENV_EXEC is used to store the number of times the process has exec'ed and to retrieve the information from shared memory, as described below. Eventually the application process 58 terminates and unregisters 60.

Figure 3:
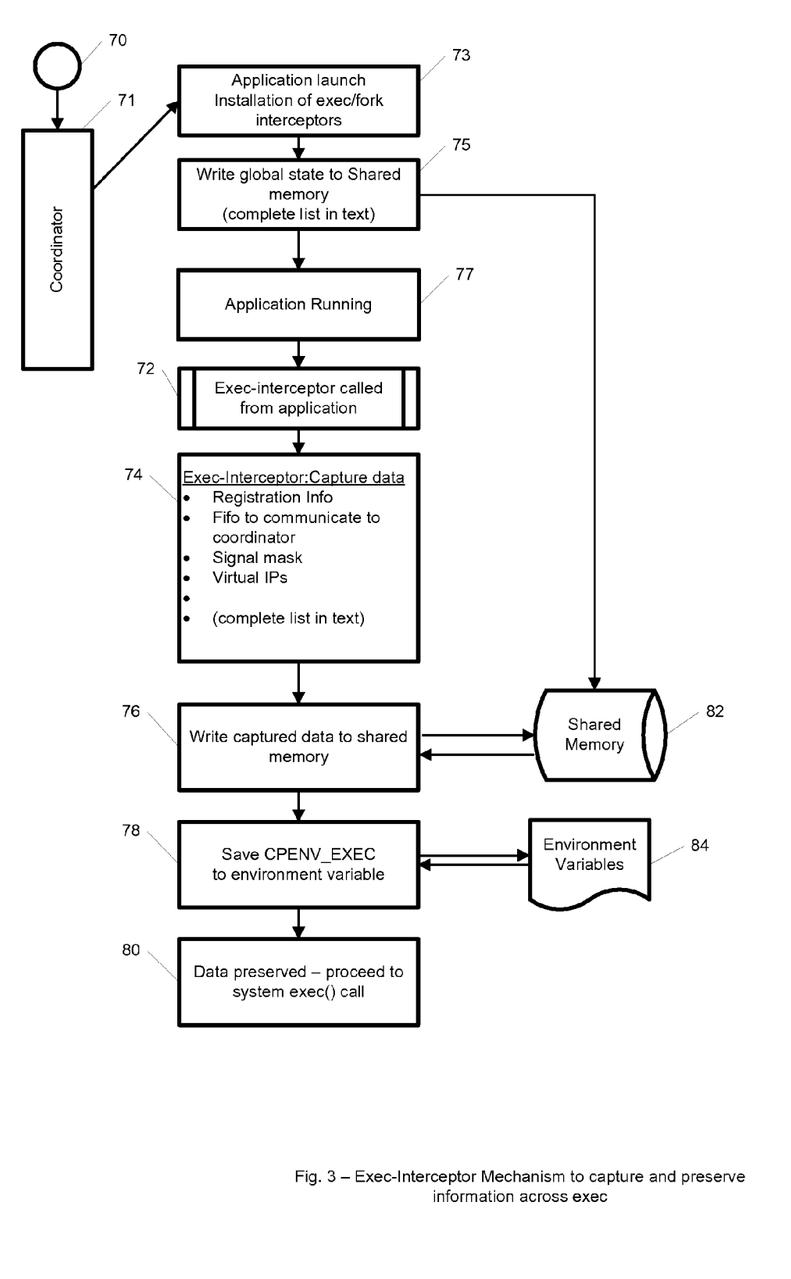
FIG. 3 is a block diagram illustrating the preservation of registration and checkpointing information across an exec( ) call.

FIG. 3 illustrates by way of example embodiment 70 how the exec-interceptor preserves its internal state across an exec call. FIG. 3 describes the state preservation across exec-calls as previously described in the exec interceptor 54 on FIG. 2. As previously described the Coordinator 71 launches the application and installs the interceptors 73. Furthermore, the invention always stores the following global application state 75 to shared memory so it is therefore available at all times:
  Checkpoint barrier info, including barrier semaphore ID
  Virtual PID table
  Pipe table
  Semaphore ID table for non-checkpointer semaphores
  SysV shared memory segment ID table (non-checkpointer segments)

After attaching to the global state in shared memory, the application resumes execution 77. The exec interceptor 72 is called when the main application calls exec. The interceptor 74 proceeds to capture all process data that must be preserved across exec. The example embodiment 70 preserves the following data using shared memory
  Registration Info
  Fifo to communicate to coordinator
  Checkpointer policies from parent
  File info for files that don't close-on-exec (descriptors, creation attributes, flags, dup info, etc.)
  Dynamic priority and scheduling policy/parameters
  Signal mask
  Virtualized resource limits
  Virtualized IP info
  Virtualized SysV shared memory segment IDs for segments the process is attached to (non-checkpointer segments)
  Application group logical name (HA_APPLICATION)
  Coordinator process ID
  Defunct children info In this context "virtualized" is utilized to mean the resource abstraction and remapping described in the two reference cited above. When all data has been assembled 76, it's written to shared memory 82. The shared memory is identified by a shared memory ID. In an example embodiment using POSIX shared memory, the shared memory ID can be constructed directly from the process ID of the process and the HA_APPLICATION name, so it is not necessary to save it to the environment. The exec-counter CPENV_EXEC is stored in the local environment 84, and the interceptor preserves it across the exec call. The shared memory is external to the process and remains unaffected by exec. With the exec-count stored in the local environment 84 and the state preserved in shared memory 82, the checkpointer library, using the exec-count and data retrieved from shared memory, takes the newly exec'ed process 80 through initialization as described under FIG. 2. In another embodiment, the shared memory ID and the CPENV_EXEC count are both written to the environment and used for correct re-initialization.

3. Incremental Checkpointing of Application Groups Started from One Application

The mechanisms for taking checkpoints of multi-process, multi-threaded processes launched from one binary and restoring from those checkpoints are described in the second reference above which was incorporated by reference.

Figure 4:
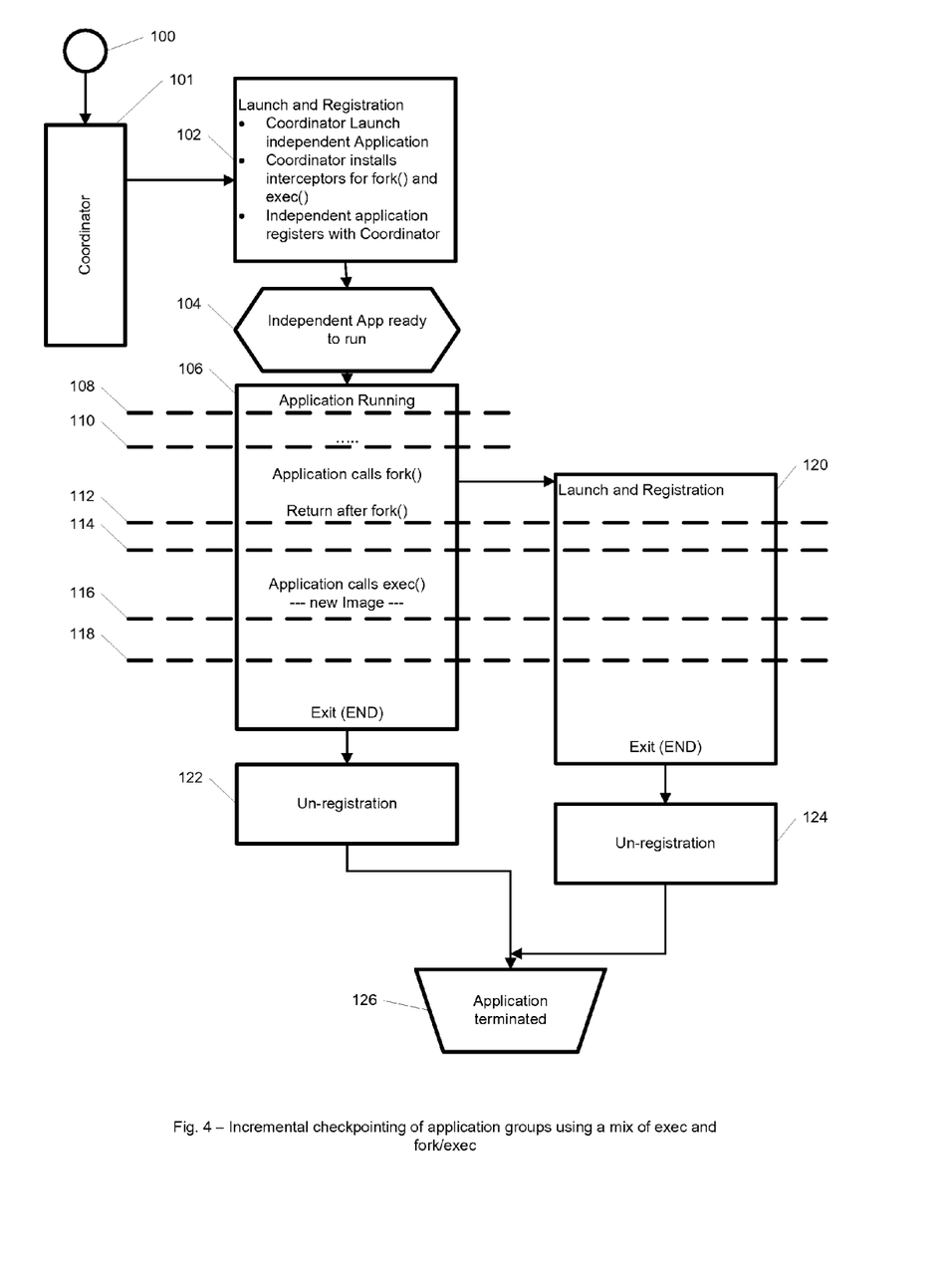
FIG. 4 is a block diagram illustrating incremental checkpointing of application groups using both fork( ) and exec( )

FIG. 4 illustrates by way of example embodiment (100), how an application group that uses both fork/exec and exec is incrementally checkpointed. The coordinator 101 launched the application 102, and then installs interceptors and registers the process as described previously. Upon completion of the initialization the application 104 is ready and starts running 106. The first checkpoint 108 is a full checkpoint as there are no prior checkpoints. The $2^{nd}$ checkpoint 110 is incremental and only contains the memory pages changed since the first checkpoint. The application now calls fork and creates a new process 120, which registers and installs interceptors. The $3^{rd}$ checkpoint 112 is a bit more involved: both the original process 106 and the new process 120 are checkpointed incrementally. Following fork, both parent and child have identical address spaces, page tables, and identical lists of dirty pages. As each process 106, 120 resume running, each become independent, but still have incremental information against the same full checkpoint; they can therefore both be checkpointed incrementally and merged against the pre-fork full checkpoint. If the child process 120 forks another process, the same description applies. The $4^{th}$ checkpoint 114 is incremental for both processes 106 and 120. The process 106 now calls exec and overlays a new image. Following the procedure described under FIG. 2 and FIG. 3 checkpointer infrastructure is preserved and the checkpointing continue to operate across the complete replacement of the address space. The $5^{th}$ checkpoint 116 is now a full checkpoint for process 106 while it continues to be incremental for 120. The $6^{th}$ checkpoint 118 is incremental for both processes 106 and 120. Upon termination of both processes 122, 124 the application terminates 126.

4. Incremental Checkpointing of Application Groups

Figure 5:
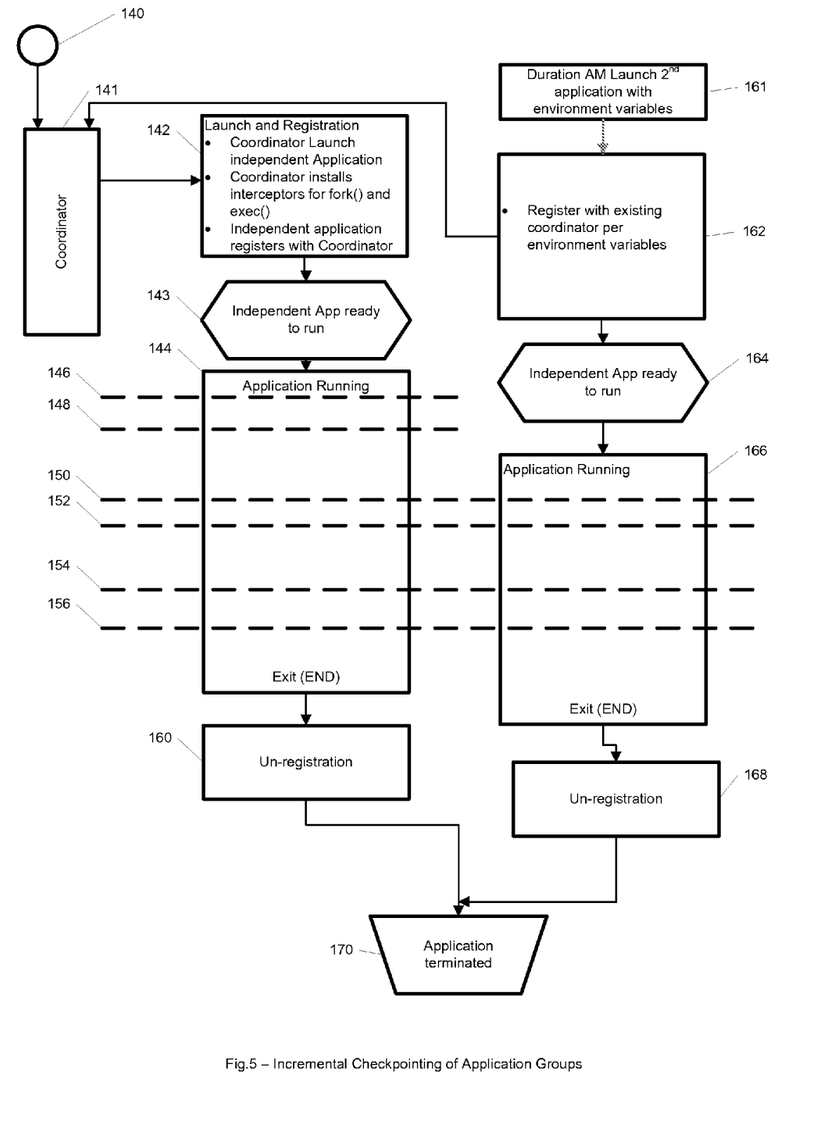
FIG. 5 is a block diagram illustrating incremental checkpointing of application groups, where the applications are launched independently.

Up until now we've described checkpointing of application groups where the independent applications are created using fork( ) and exec( ) from one application. We now turn to application groups consisting of multiple independent applications launched independently at different times. FIG. 5 illustrates by way of an example embodiment 140 how the coordinator 141 first launches application 142 and then installs interceptors and registers 142 with the coordinator. Application 142 is ready to run 143 and proceeds to run 144. In the meantime the Duration AM 161 launches a second independent application 162 and provides passes the coordinator 141 process ID and HA_APPLICATION name in the environment. Using the Coordinator PID and the HA_APPLICATION name, the application 162 registers with the coordinator 141. The second application is ready to run 164 and proceeds to run 166. While FIG. 5 looks similar to FIG. 4 there is one very significant difference: in FIG. 4, the second application 120 is created by fork( ) from the first application 102, while in FIG. 5 the second application 162 is launched independently from the first application 142. The mechanism by which application 162 joins an already running coordinator and checkpoint barrier is described in FIG. 6. The first checkpoint 146 is taken as a full checkpoint of application process 144. This is followed by an incremental checkpoint 148. The third checkpoint 150 includes the second independent application 166, and contains an incremental checkpoint for application 144 and a full checkpoint of application process 166. The fourth checkpoint 152 is incremental for both applications 144 and 166. The embodiment in FIG. 5 shows applications 144 and 166 without any use of fork( ) and exec( ).

It is readily apparent to someone skilled in the art, that application 144,166 could use fork( ) and/or exec( ) and combined with the teachings above application groups containing any number of independent application, launched independently or via fork/exec can be checkpointed using the present invention.

5. Launching Independent Applications

Figure 6:
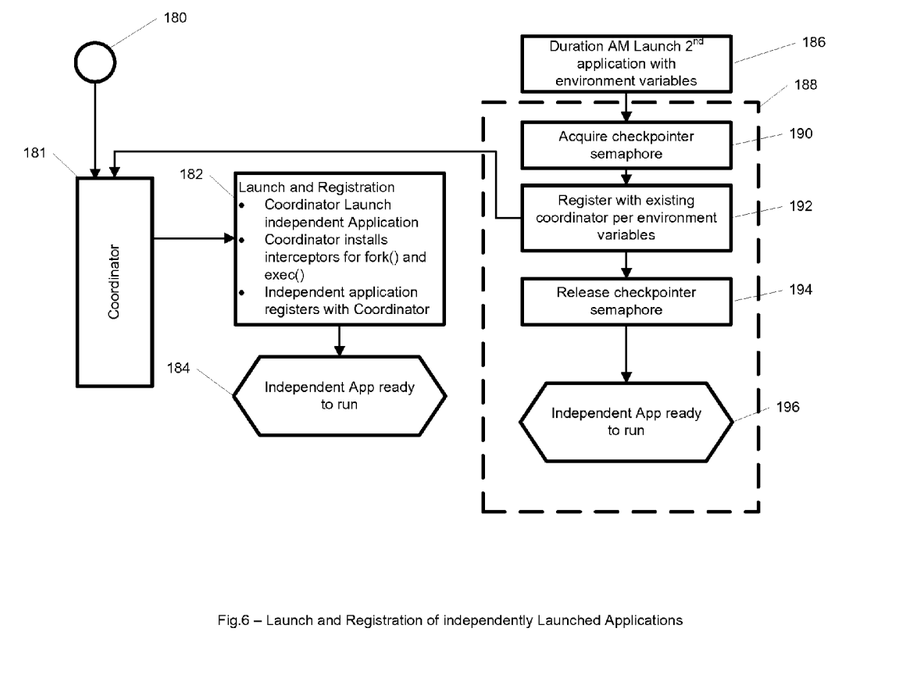
FIG. 6 is a block diagram illustrating launch and registration of independently launched applications.

In order to let any independent application join an existing coordinator and application group, that new application needs to be able to find and communicate with the coordinator. FIG. 6 is an example embodiment 180 of how that can be achieved. The coordinator 181 launches the first application 182 and, as previously described, takes it through registration 182 and proceeds to let it run 184. At a later time, the Duration AM 186 launches a second application 188 and passes the coordinator 181 PID and HA_APPLICATION name via the environment. As described in the second reference, checkpointing is coordinated using a checkpointer semaphore. As described above the checkpointer semaphore is always stored in shared memory, and can be accessed via the shared memory ID constructed from the coordinator PID and HA_APPLICATION name both of were provided to the application 188 via the environment. The coordinator 181 is unaware of the second application 188 until registration, and could conceivably trigger a checkpoint during the registration process. To prevent checkpointing of partially launched applications, the second application 188 first acquires the checkpointer semaphore 190, which prevents the coordinator 181, from triggering checkpoints. This is followed by registration 192 with the coordinator 181 and followed by the release of the checkpointer semaphore 194. The mechanism for obtaining and releasing semaphores are well known in the art and will not be described further here. The new application 188 is now ready to run 196.

The launch mechanism described here combines with the previous teaching and completes the support for coordinated checkpointing of application groups to include both programmatic creation of processes with fork( ) and external loading of new processes with the AM. The teachings also support loading the applications at different times, as just described above.

6. Restoring an Application Group

Figure 7:
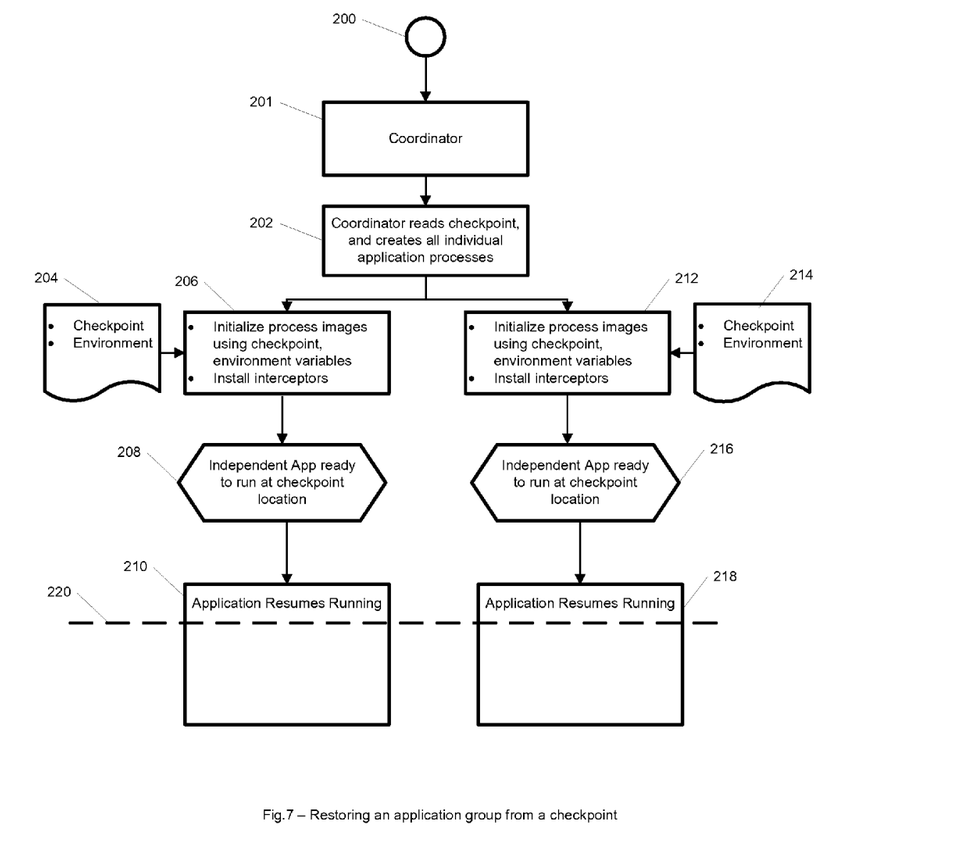
FIG. 7 is a block diagram illustrating restoration of an application group from a checkpoint.

The mechanisms for restoring multi-process, multi-threaded applications launched from one binary are described in the second reference above which was incorporated by reference. The checkpoints for the application groups contains all the process and thread tree hierarchy information, the environmental information needed to register independent applications and checkpoint across exec. FIG. 7 illustrates an example embodiment 200 of restoring an application groups. As described in the second reference, the coordinator 201 is initially launched as a place holder for all processes to be restored. The coordinator reads the process tables 202 from the checkpoint and creates the process hierarchy 206, 212 for the entire application group. For the first process 206 the image is restored from the checkpoint and the environment variables 204. After the process hierarchy has been recreated each process exec its binary image the same number of times it previously exec'ed using checkpoint and environment variables. The second process 212 is similarly restored from checkpoint and environment variables 214, and each process exec as described for the first process. Interceptors for both application processes 206 and 212 are also installed at this point. The independent applications 208, 216 are now ready to run and proceed to execute as of the restored checkpoints 210, 218. Both independent applications 210, 218 now run and are checkpointed 220 using the techniques previously taught.

7. Storage Checkpointing

The mechanism for checkpointing the storage associated with a multi process application is described in reference two and incorporated by reference. The mechanisms as taught works as described for each application in an application groups. Combining the above teaching of coordinated checkpointing of application groups with the storage checkpointing for individual applications, the combined teachings fully covers storage checkpointing of application groups.

8. Incremental Checkpointing of Memory Pages Written from Kernel Space

Figure 8:
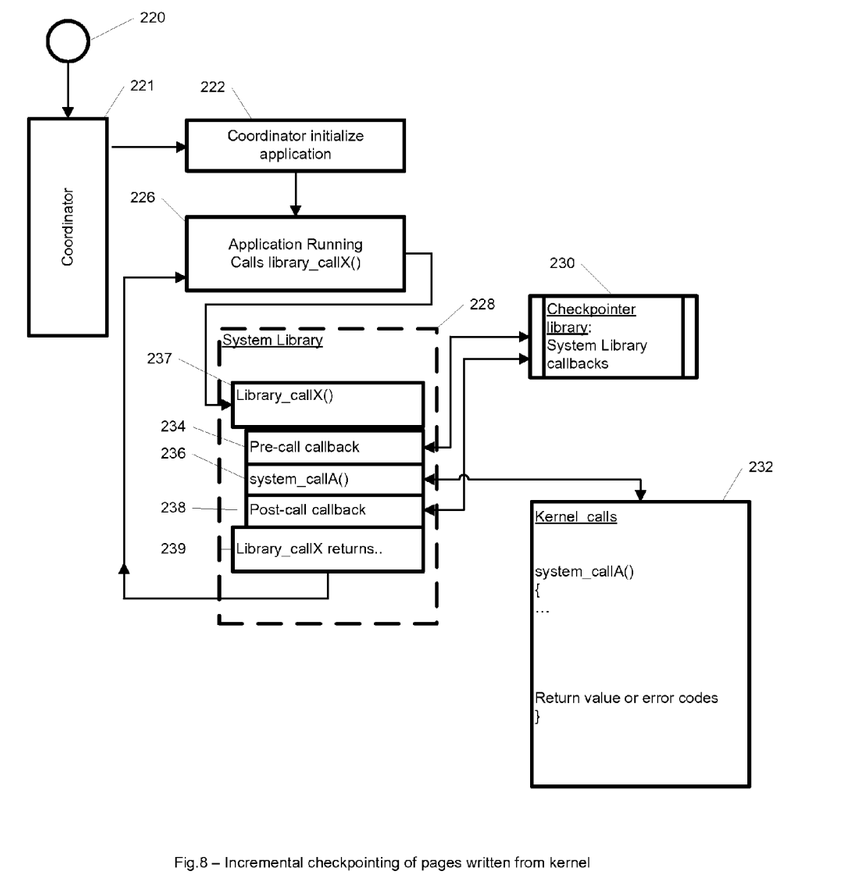
FIG. 8 is a block diagram illustrating incremental checkpointing of memory pages written from kernel space.

The mechanism for incremental checkpointing and how to mark/clear dirty pages written from user-space is described in reference two and incorporated by reference. The mechanism relies on interception of SIGSEGV signal as described. However, attempts to write to read-only use-space pages in memory from kernel-mode, i.e. from a system call, do not trigger SIGSEGV; rather they return EFAULT as an error code. Systems calls in general return an EFAULT error in stead of triggering the SIGSEGV should they write to read-only application memory. The present invention adds full support for EFAULT from system calls, in addition to SIGSEGV. It should be noted that in the example embodiment system library functions can also return EFAULT. Since the system library EFAULTS originate outside kernel-mode, the previous teachings above apply; here we're only concerned with pages written from kernel space, i.e. system calls. FIG. 8 illustrates an example embodiment 220 of the coordinator 221 initializes 222 and launches the application or application group 226 as previously described. In one embodiment of the invention, a customized system library 228 is used. The customized system library 228 contains predefined pre-system-call and post-system-call function-calls to the checkpointer library. By way of example, we consider the case where the application 226 calls a system-library call "library_callX( )" located in the system library 228. Initially the entry point library_callX( ) 237 is called. Before reaching the system call 236 it executes the pre-call callback 234 and registers information with the checkpointer 230, then the system call 236 named "system_callA( )" by way of example is run. The system call reaches the kernel 232 and system_callA( ) runs and returns potentially with an EFAULT error condition. The post-call callback 238 processes the error codes, if any, and updates via the callbacks 230 the page tables maintained by the checkpointer. Finally, control returns 239 to the application 226 and execution continues.

In another embodiment the standard system library is used, and the pre-system-call and post-system-call callbacks are installed dynamically by the coordinator as part of application initialization

9. Handling of EFAULT

As described in reference two and incorporated by reference, processing a SIGSEGV fault is done by updating the page table and making the page writable. We now proceed to describe the handling of EFAULT is more detail. Continuing with the example embodiment 220 in FIG. 8. If the system call "system_callA( )" safely can be called again, the pre/post callbacks operate as follows:

1. pre-call callback 234 does nothing
2. post-call callback 238 determines if EFAULT was returned. If EFAULT was returned due to the checkpointer write-protecting one of more of system_callA( )'s call-arguments memory pages, the pages are marked as writable, the checkpointers page table updated, and the system_callA( ) is called again.

If system_callA( ) cannot be safely called again, the present invention proceeds as follows:

1. the pre-call callback 234 marks memory pages belong to the calls arguments as dirty and disables write-protection for the duration of the system call.
2. let the call to system_callA( ) go through 236
3. the post-call callback 238 then re-enables write protection for the affected pages The terms "call-arguments memory pages" and "memory pages belonging to call argument" is utilized to mean the following. By way of example, a function might have a number of parameters, some of which are pointers to memory locations. The aforementioned "memory pages" are the memory pages referenced, or pointed to, by pointers in argument list.

In another embodiment all EFAULT handling is done in a kernel module sitting under the system library.

10. Loss-Less Migration of Application Groups.

Referring once again to FIG. 2 for illustrative purposes, the case of migrating the distributed application from one set of nodes to another set of nodes is considered. Migration of live applications is preferably utilized in responding to the anticipation of faults, such as detecting that a CPU is overheating, a server is running out of memory, and the like, when the administrator wants to re-configure the servers or when the servers currently being used have to be freed up for some reason.

Building on the disclosures above, a loss-less migration is achieved by: first checkpointing the application group, including all independent applications and optionally the local transports, then restoring all independent applications and optionally the local transports from the checkpoints on the backup nodes. The migration is loss-less, which means that no data or processing is lost.

11. Virtualization and Live Migration of Application Groups

Loss-less migration of application groups can be viewed differently. The ability to checkpoint and migrate entire application groups, makes the application location-independent. The application groups can be moved, started and stopped on any server at any point in time. The present teaching therefore shows how to de-couple a live running instance of an application from the underlying operating system and hardware. The application execution has therefore been virtualized and enables live migration, ie a migration of a running application, without any application involvement or even knowledge.

12. Deployment Scenarios

Figure 9:
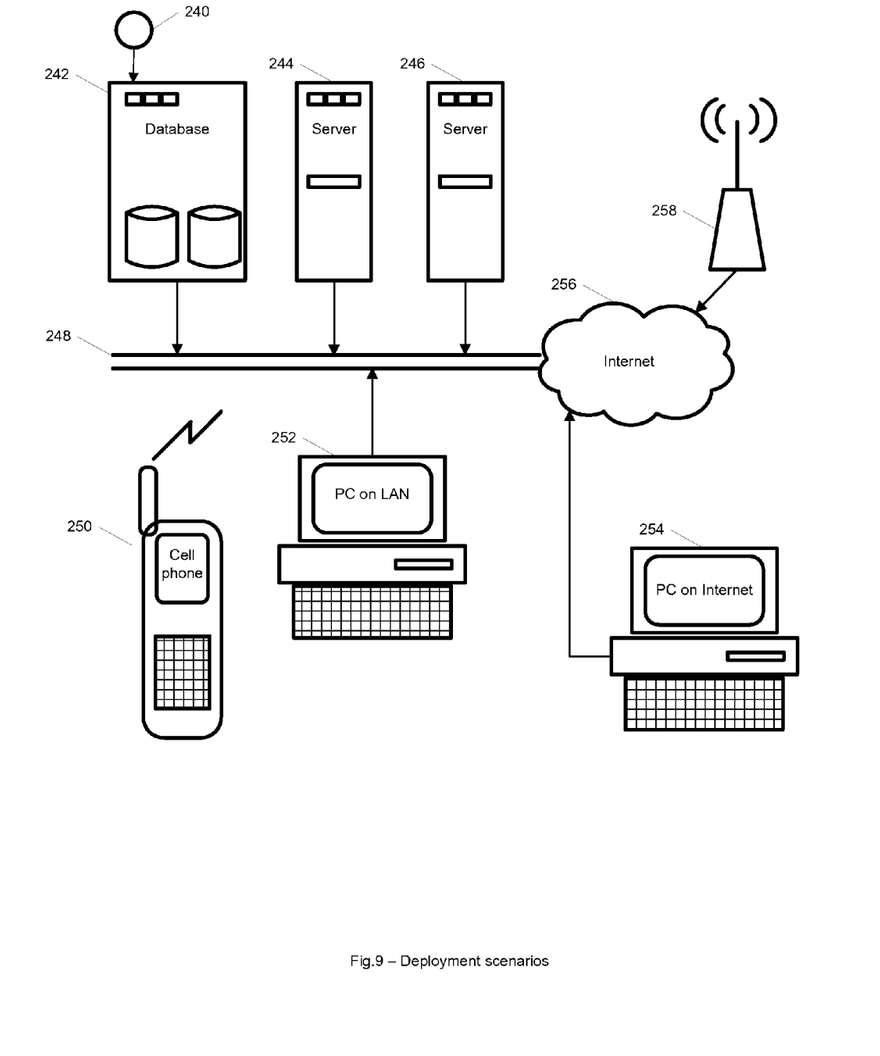
FIG. 9 is a block diagram illustrating typical deployment scenarios.

FIG. 9 illustrates by way of example embodiment 240 a variety of ways the invention can be configured to operate. In one embodiment, the invention is configured to protect a database 242, in another it is configured protect a pair of application servers 244, 246. In a third embodiment the invention is configured to protect a LAN 248 connected PC 252 together with the application servers 244, 246. In a fourth embodiment the invention is configured to protect applications on a cell phone 250, which is wirelessly connected 258 to the Internet 256 the application servers 244,246 and the database 242. A fifth embodiment has a home-PC 254 connected via the internet 256 to the application servers 244,246 and the LAN PC 252. The invention runs on one or more of the devices, can be distributed across two or more of these elements, and allows for running the invention on any number of the devices (242,244,246,250,252,254) at the same time providing either a joint service or any number of independent services.

13. System Diagram

Figure 10:
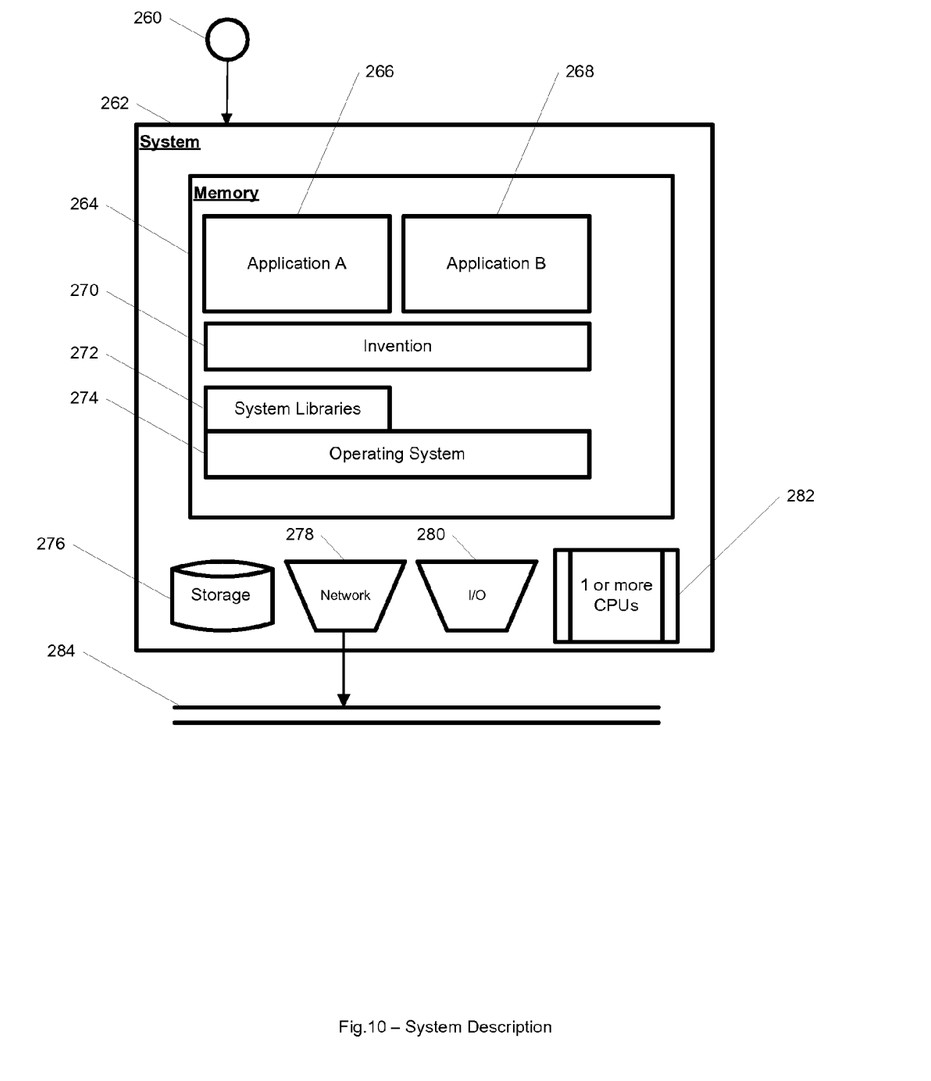
FIG. 10 is a block diagram illustrating devices and computers running the invention.

FIG. 10 illustrates by way of example embodiment 260 a typical system 262 where the invention, as described previously, can run. The system memory 264 can store the invention 270 as well as any running application 266, 268 being protected. The system libraries 272 and operating system 274 provide the necessary support. Local or remote storage 276 provides persistent storage of and for the invention. The invention is generally loaded from storage 276 into memory 264 as part of normal operation. One or more CPUs 282 performs these functions, and may uses the network devices 278, to access the network 284, and Input/Output devices 280.

14. Conclusion.

In the embodiments described herein, an example programming environment was described for which an embodiment of programming according to the invention was taught. It should be appreciated that the present invention can be implemented by one of ordinary skill in the art using different program organizations and structures, different data structures, and of course any desired naming conventions without departing from the teachings herein. In addition, the invention can be ported, or otherwise configured for, use across a wide-range of operating system environments.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of checkpointing an application group comprised of one or more single-process or multi-process applications, the method comprising:
    creating at least one full checkpoint for each one or more applications in the application group;
    creating at least one incremental application checkpoint for each one or more applications in the application group;
    automatically merging each of the at least one incremental application checkpoint against a corresponding full application checkpoint;
    synchronizing checkpointing across said one or more applications in the application group; and
    preloading interceptors for fork( ) and exec( );
    wherein
        said interceptor for exec( ) preserves existing application state prior to calling the system call exec( ) by storing said application state in shared memory prior to calling the system call exec( ) and restoring said application state from shared memory after the system call exec( ) returns; and
        said one or more applications each started from at least one of: one root application or independently.

2. The method according to claim 1, wherein the one or more applications in the application group are started from one binary and said one binary is a root application loading said one or more applications.

3. The method according to claim 1, wherein the one or more applications in the application group are independently started and said one or more applications join said application group upon loading.

4. The method according to claim 1, wherein the one or more applications in the application group comprise a shell script.

5. The method according to claim 1, further comprising using an environment variable to store a number of times a process has exec( )'ed across exec( ).

6. The method according to claim 1, further comprising using incremental checkpointing across fork( ) without requiring an additional full checkpoint.

7. The method according to claim 1, further comprising passing information across an exec( ) call using environment variables combined with shared memory.

8. The method according to claim 1, wherein creating the at least one incremental application checkpoint includes using memory pages written from kernel space.

9. The method according to claim 8, wherein EFAULT error messages are handled if caused by the checkpointer, or propagated to the application if not caused by the checkpointer.

10. The method according to claim 1, wherein the checkpointing does not modify the individual applications in the application group.

11. The method according to claim 1, further comprising restoring the application group in its entirety from application group checkpoints.

12. The method according to claim 11, further comprising:
    performing storage checkpointing of associated files; and
    performing restoration of storage checkpoints when restoring the application group checkpoints.

13. The method according to claim 1, further comprising using an environment variable to preserve, across exec, the number of times a process must exec prior to restoring its data.

14. The method according to claim 1, further comprising using a customized system library.

15. The method according to claim 1, wherein standard system libraries are used, and customization is done using interception.

16. A method for achieving transparent integration of an application group with a high-availability protection program, the method comprising:
    injecting registration code, transparently and automatically, into all independent applications of the application group when the independent applications launch;
    preloading interceptors for fork( ) and exec( );
    registering the independent applications automatically with the high-availability protection program;
    detecting a failure in an execution of the application group or any of the independent applications within the group; and
    executing the application group from a backup automatically in response to the failure;
    wherein
        said interceptor for exec( ) preserves existing application state prior to calling the system call exec( ) by storing said application state in shared memory prior to calling the system call exec( ) and restoring said application state from shared memory after the system call exec( ) returns; and
        said one or more applications may be started from one root application, or started independently.

17. The method according to claim 16, wherein the injecting step is performed without at least one of a need of modifying or recompiling the independent applications and a custom loader.

18. A method for performing fault protection for applications distributed across multiple computer nodes, the method comprising:
- providing high-availability application services for transparently loading the applications;
- registering the applications for protection;
- preloading interceptors for fork( ) and exec( );
- detecting faults in the applications, and initiating recovery of the applications;
- taking checkpoints of the applications within the applications groups; and
- restoring the applications from the checkpoints in response to initiating recovery of one or more the applications;

wherein
- said interceptor for exec( ) preserves existing application state prior to calling the system call exec( ) by storing said application state in shared memory prior to calling the system call exec( ) and restoring said application state from shared memory after the system call exec( ) returns; and
- said one or more applications may be started from one root application, or started independently.

19. The method according to claim 18, wherein the high-availability application services are provided to the applications that are running on a primary node, while at least one backup node stands ready in an event of a fault and subsequent recovery of at least one of the applications.

* * * * *